April 1, 1930.    R. LEX    1,752,956
APPARATUS FOR SPRAYING PULVERULENT MATERIAL
Filed May 19, 1928
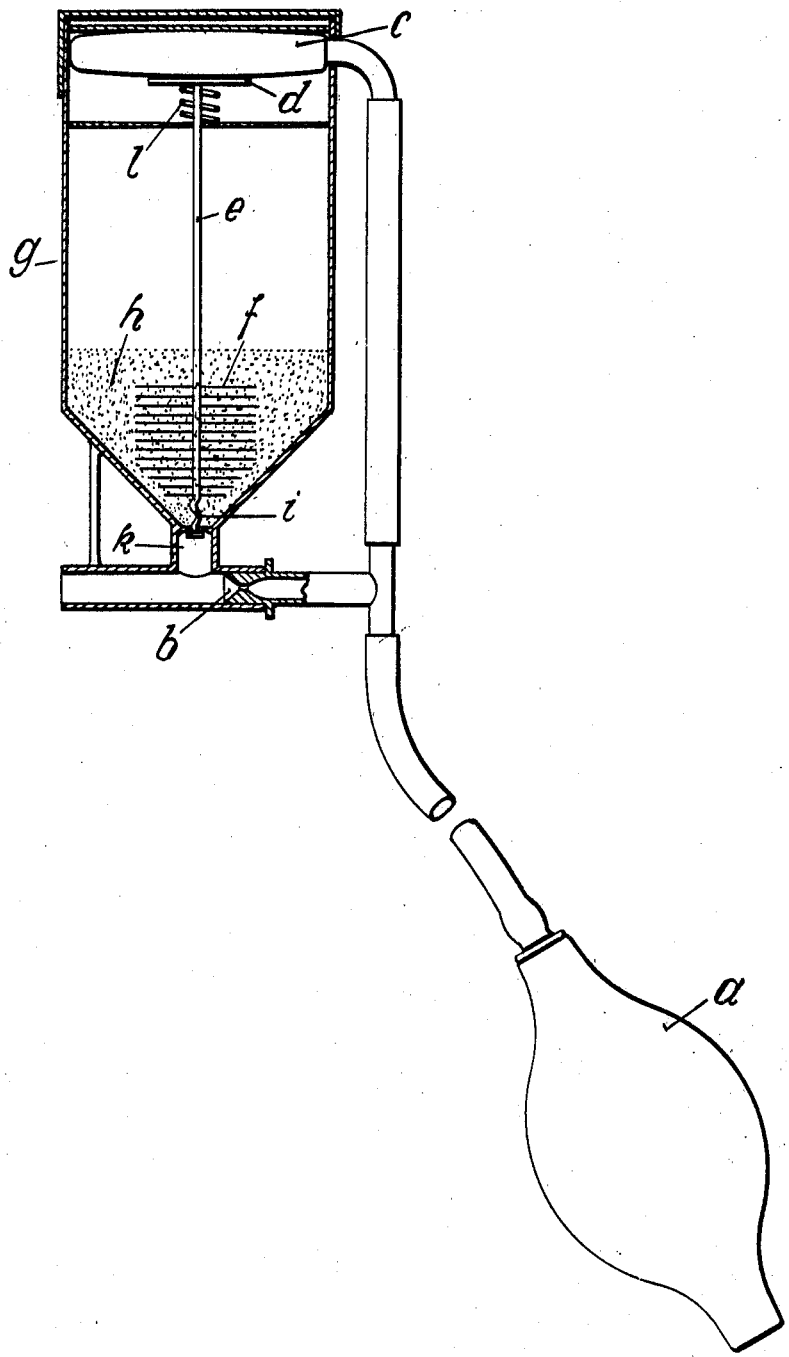
INVENTOR:
Rudolf Lex
BY: Ruegr, Boyn & Bakeler
ATTORNEYS.

Patented Apr. 1, 1930

1,752,956

UNITED STATES PATENT OFFICE

RUDOLF LEX, OF COLOGNE, GERMANY, ASSIGNOR OF ONE-HALF TO KARL ZEYEN, OF COLOGNE, GERMANY

APPARATUS FOR SPRAYING PULVERULENT MATERIAL

Application filed May 19, 1928, Serial No. 279,043, and in Germany April 21, 1927.

For many purposes it is necessary to spray flour-like and similar substances in a very finely divided state. With the use of known spraying devices this is not always possible because many of these substances readily cake together. For example, in a known form of spraying apparatus the spraying tube provided with holes is in part surrounded by an air blower and in part led through a powder reservoir. The spraying tube is moved by hand, while the air coming from the air blower passes through the holes of the spraying tube into the reservoir and there sprays the available powder. This known spraying apparatus is suitable for the spraying of non-caking powders only, but not for the spraying of flour-like materials. If the known arrangement were used to spray these latter, it would cease to function properly after a short time, as the holes in the spraying tube would quickly become blocked.

The object of the present invention is to overcome this objection. For this purpose the spraying apparatus with air blower for spraying flour-like and similar substances is provided with a plunger-like feed member arranged to feed the material to be sprayed into the air stream from the nozzle, said plunger being operated by the blower causing the spraying. By this means a caking together of the flour-like material is avoided and the latter is blown out of the apparatus in a very finely divided state. In addition there is always an approximately equal quantity of the spraying material in the air stream so that a uniform spraying is obtained. Because of this the apparatus is also suitable for inhalation purposes in which it would be bad for the patient if agglomerated particles were to reach the respiratory organs. Further the apparatus is suitable for the spraying of dyestuffs and the like and for other technical purposes.

One embodiment of the invention is illustrated by way of example in the accompanying drawing.

When the rubber bulb $a$ is compressed, part of the air streams out of the nozzle $b$ while the remainder is led into the hollow rubber sack $c$. The latter is expanded thereby and presses on the top plate $d$ of a feeding plunger $e$ whereby the latter is moved downwards. To the feeding plunger $e$ are attached wire pins, bristles or the like, $f$, which during the motion of the feeding plunger loosen the material $h$ contained in the reservoir $g$. The lower end $i$ of the feeding plunger in helical and in each downward motion feeds a fixed quantity of flour or meal or the like through the opening $k$ in the reservoir $g$ into the air current passing through the jet $b$. In this manner with every compression of the bulb $a$ approximately the same quantity of material is presented before the nozzle and is finely sprayed by the air stream passing therethrough. A spring $l$ restores the feeding plunger $e$ to its normal position after each compression of the bulb.

Having now particularly described and ascertained the nature of my said invention and in what manner the same is to be performed, I declare that what I claim is:—

1. A sprayer, comprising a container having an outlet port, a movable plunger within said container and having means normally closing said port, air supply means communicating with said outlet port, means operated by said air supply means for moving said plunger thereby to uncover said port, and means for restoring the plunger to port-closing position.

2. A sprayer, comprising a container having an outlet port, a movable plunger within said container and having means normally closing said port, air supply means communicating with said outlet port, means operated by said air supply means for moving said plunger thereby to uncover said port, and means for restoring the plunger to port-closing position, said plunger being adapted during its uncovering movement to feed a definite quantity of material from said container into the outlet port.

3. A sprayer for pulverulent material, comprising a container having an outlet port, a movable plunger within said container and having means normally closing said port, air supply means communicating with said outlet port, means operated by said air supply means for moving said plunger thereby to uncover said port, means for restoring the plunger to port-closing position, and means carried by said plunger for loosening the material in the container during movement of the plunger.

4. A sprayer for pulverulent material, comprising a container having an outlet port, a movable plunger within said container and having means normally closing said port, air supply means communicating with said outlet port, means operated by said air supply means for moving said plunger thereby to uncover said port, means for restoring the plunger to port-closing position, and means carried by said plunger for loosening the material in the container during movement of the plunger, said plunger being adapted during its uncovering movement to feed a definite quantity of material from the container into the outlet port.

5. A sprayer, comprising a container having an outlet port, a movable plunger within said container and having means for closing said port, a spring normally retaining said plunger in port-closing position, a blower communicating with said port, air-actuated means for moving said plunger against the tension of its spring thereby to uncover said port, and a communicating conduit between said blower and said air-actuated means.

6. A sprayer for pulverulent material, comprising a container having an outlet port, a movable plunger within said container and having means for closing said port, resilient means normally retaining said plunger in port-closing position, a blower communicating with said port, and means operated by said blower for moving the plunger thereby to uncover said port, said plunger having a helical portion adapted during the uncovering movement of the plunger to feed a definite quantity of material from said container into the outlet port.

7. A sprayer, comprising a container having an outlet port, a movable plunger within said container and having means for closing said port, a spring normally retaining said plunger in port-closing position, a blower communicating with said part, a collapsible elastic bag disposed between a wall of the container and one end of the plunger, and a communicating conduit between said bag and the blower for inflating the bag and moving the plunger against the tension of its spring thereby to uncover the port.

In testimony whereof I have signed my name to this specification.

RUDOLF LEX.